(12) United States Patent
Dismon et al.

(10) Patent No.: US 7,343,743 B2
(45) Date of Patent: Mar. 18, 2008

(54) EXHAUST-GAS RETURN SYSTEM FOR AN INTERNAL-COMBUSTION MACHINE AND METHOD OF RETURNING EXHAUST GAS

(75) Inventors: Heinrich Dismon, Gangelt (DE); Andreas Koester, Essen (DE)

(73) Assignee: Pierburg GmbH, Neuss (DE)

( * ) Notice: Subject to any disclaimer, the term of this patent is extended or adjusted under 35 U.S.C. 154(b) by 113 days.

(21) Appl. No.: 11/320,331

(22) Filed: Dec. 28, 2005

(65) Prior Publication Data
US 2006/0156724 A1 Jul. 20, 2006

(30) Foreign Application Priority Data
Jan. 19, 2005 (DE) .................. 10 2005 002 518

(51) Int. Cl.
*F02D 23/00* (2006.01)
(52) U.S. Cl. .................. 60/605.2; 60/599; 60/600; 60/602
(58) Field of Classification Search ............. 60/605.2, 60/320, 274, 604, 616; 123/568.12, 568.31, 123/568.2, 568.13
See application file for complete search history.

(56) References Cited

U.S. PATENT DOCUMENTS

| | | | |
|---|---|---|---|
| 6,647,970 B2 * | 11/2003 | Hankins | 123/568.12 |
| 6,675,579 B1 * | 1/2004 | Yang | 60/599 |
| 7,210,468 B1 * | 5/2007 | Saele | 123/568.12 |
| 2007/0039321 A1 * | 2/2007 | Sheidler et al. | 60/599 |

FOREIGN PATENT DOCUMENTS

EP 0 489 263 B1 10/1999

\* cited by examiner

*Primary Examiner*—Thomas Denion
*Assistant Examiner*—Douglas J. Duff
(74) *Attorney, Agent, or Firm*—Ohlandt, Greeley, Ruggiero & Perle L.L.P.

(57) ABSTRACT

An exhaust gas return system for an internal-combustion machine which comprises a low-pressure supply line extending from an inlet From the compressor. a high-pressure supply line extends to the internal-combustion machine. From the internal-combustion machine a high-pressure exhaust gas line extends to a turbine. From the turbine a low-pressure exhaust gas line extends to an outlet. The low-pressure exhaust gas line and the low-pressure supply line have connected therewith a low-pressure return line for returning exhaust gas. The high-pressure exhaust gas line has connected therewith a bypass line for utilizing the heat of the exhaust gas produced in the internal-combustion machine for heating the exhaust gas to be returned of the low-pressure return line before the exhaust gas is supplied to the turbine (24), if desired. Thus the cold start phase of the internal-combustion machine can be reduced.

10 Claims, 1 Drawing Sheet

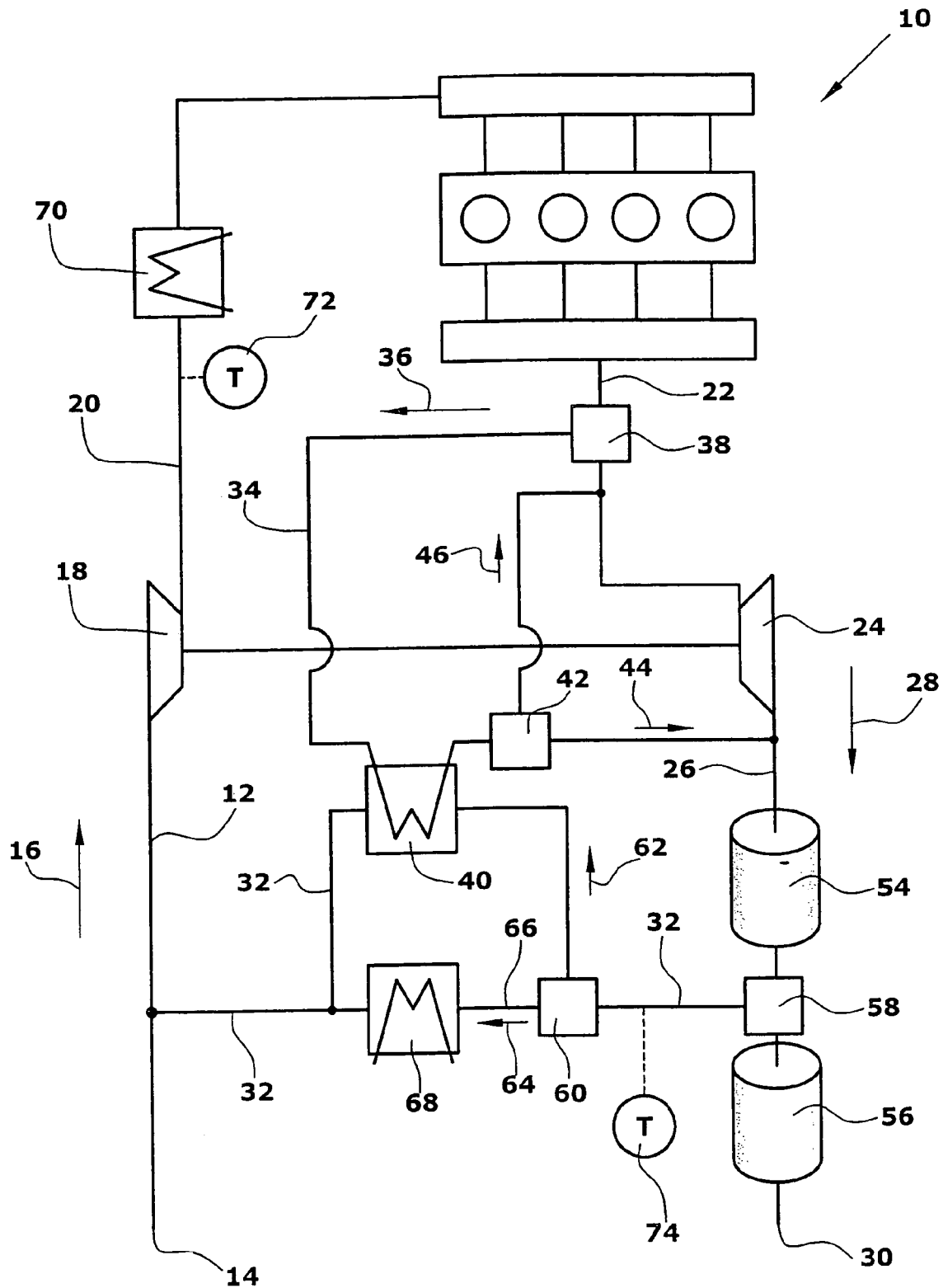

EXHAUST-GAS RETURN SYSTEM FOR AN INTERNAL-COMBUSTION MACHINE AND METHOD OF RETURNING EXHAUST GAS

BACKGROUND OF THE INVENTION

1. Field of the Invention

The present invention relates to an exhaust gas return system for an internal-combustion machine, in particular a diesel engine, for returning exhaust gas produced in the internal-combustion machine to fresh air to be supplied to the internal-combustion machine. Further, the invention relates to a method of returning exhaust gas, wherein the exhaust gas of the internal-combustion machine can be returned to the fresh air used for the internal-combustion machine.

2. Description of Related Art

Conventional exhaust gas return systems comprise a piping system extending from an outlet of an internal-combustion machine to an inlet. For this purpose, the exhaust gas return system comprises a low-pressure supply line extending from an inlet to a compressor. A high-pressure supply line extends from the compressor to the internal-combustion machine for supplying fresh air aspirated at the inlet to the internal-combustion machine, in particular a combustion engine. After combustion in the internal-combustion machine, the exhaust gas produced in the internal-combustion machine is fed via a high-pressure exhaust gas line from the internal-combustion machine to a turbine. From the turbine, the exhaust gas is fed via a low-pressure exhaust gas line to an outlet. To reduce the amount of harmful substances of the exhaust gas and improve the combustion process in the internal-combustion machine, a low-pressure return line connected with the low-pressure exhaust gas line and the low-pressure supply line is provided, said low-pressure return line supplying part of the exhaust gas to the low-pressure supply line, whereby part of the exhaust gas is returned.

Such an exhaust gas return system has a drawback in that in particular during the cold start phase of the internal-combustion machine, the temperature of the fresh air to be supplied to the internal-combustion machine is not optimally adjusted and reaches the value required for satisfactory combustion only after some time. This results in unfavorable combustion in the internal-combustion machine such that, in particular in a diesel engine, the exhaust gas contains large portions of soot particles and entrained oil.

For reducing the cold start phase it is common practice to return the hot exhaust gas from the internal-combustion machine via a high-pressure return is line to the high-pressure supply line. Thus however the soot particles and entrained oil contained in the exhaust gas are returned to the internal-combustion machine such that unwanted contaminants are concentrated in the internal-combustion machine, whereby the combustion process in the internal-combustion machine is deteriorated. Further, this leads to higher wear of the internal-combustion machine, in particular in the area of the inlet valves, and to fouling of swirl flaps. In particular, the soot particles are critical for the cylinder bores of the internal-combustion machine.

SUMMARY OF THE INVENTION

It is an object of the present invention to provide an exhaust gas return system and a method of returning exhaust gas with an improved cold start behaviour.

According to the invention, an exhaust gas return system for an internal-combustion machine, in particular a diesel engine, comprises a low-pressure supply line extending from an inlet to a compressor. From the compressor a high-pressure supply line extends to the internal-combustion machine. From the internal-combustion machine a high-pressure exhaust gas line leads to a turbine such that the exhaust gas produced in the internal-combustion machine can be supplied to the turbine. From the turbine a low-pressure exhaust gas line leads to an outlet. The low-pressure exhaust gas line and the low-pressure supply line have connected therewith a low-pressure return line for returning exhaust gas. According to the invention, the high-pressure exhaust gas line has connected therewith a bypass line for utilizing the heat of the exhaust gas produced in the internal-combustion machine for heating the exhaust gas to be returned of the low-pressure return line.

According to a first independent invention, the bypass line comprises a heat exchanger for heating at least part of the exhaust gas to be returned of the low-pressure return line. From the heat exchanger the bypass line extends back to the high-pressure exhaust gas line and/or past the turbine to the low-pressure exhaust gas line.

According to a second independent invention, a preferred embodiment of which is realized together with the first invention, the bypass line extends in particular directly from the high-pressure exhaust gas line to the low-pressure exhaust gas line, i.e. past the turbine. For heating the exhaust gas to be returned a heat exchanger is not required since the heat of the hot exhaust gas from the internal-combustion machine can be directly used for heating the exhaust gas to be returned. The turbine is thus bypassed and is not allowed to extract heat from the exhaust gas.

By means of the bypass line it is possible, due to return of the exhaust gas, to use the heat of the hot exhaust gas for heating the exhaust gas to be returned and/or for heating the fresh air to be supplied, without the contaminants contained in the exhaust gas being returned to the internal-combustion machine. Further, a high-pressure return line, which may be necessary otherwise, can be omitted. Moreover, the heat of the exhaust gas is preferably used for heating the exhaust gas to be returned and only then for heating the turbine which, in particular together with the compressor, constitutes a turbo-charger. A delay in the heating of the exhaust gas to be returned caused by the heat capacity of the turbocharger is thus prevented. Further, higher temperatures are more rapidly reached in the low-pressure exhaust gas line such that any existing catalyst more rapidly operates in the optimal range. In particular when part of the exhaust gas is directed past the turbine, an exhaust gas treatment device which may be provided in the low-pressure exhaust gas line, e.g. a catalyst, is heated before heating the turbocharger, whereby the emission of harmful exhaust gases and substances, such as $No_x$, $CO$, $SO_2$, is reduced. Since the rapid heating of the fresh air promotes as complete a combustion in the internal-combustion machine as possible, emission of harmful exhaust gases and substances is further reduced.

In a preferred embodiment, the bypass line and/or the high-pressure exhaust gas line comprise a bypass valve for adjusting the volume flow into the bypass line. This in particular allows, for example during the cold start phase and/or the idle phase of the combustion engine, a particularly high volume flow to be directed through the bypass line and to correspondingly reduce the volume flow with gradual increase in the temperature of the fresh air. This allows the bypass line to be closed during the warm-up phase or when suddenly a particularly high output of the combustion engine is required, such that as much energy as possible of the exhaust gas from the internal-combustion machine can be utilized in the compressor.

Preferably, the bypass line comprises a turbine bypass valve which is adapted to determine the volume flow to be supplied past the turbine to the low-pressure exhaust gas line. Accordingly, the turbine bypass valve is configured to determine the volume flow to be supplied via the bypass line to the turbine.

Preferably, the low-pressure exhaust gas line and/or the low-pressure return line comprise an exhaust gas return valve. The exhaust gas return valve is configured for adjusting the volume flow into the low-pressure return line. Additionally and/or alternatively, the low-pressure return line may comprise a heat exchanger valve for adjusting the volume flow through the heat exchanger. For this purpose, the low-pressure return line may comprise a bypass line via which the volume flow, which is not to be supplied to the heat exchanger, is directed past the heat exchanger.

In the method of returning exhaust gas according to the invention, exhaust gas produced in an internal-combustion machine is returned to a fresh air flow used for the internal-combustion machine. For this purpose, first fresh air for the internal-combustion machine is aspirated. By means of the aspirated fresh air a combustion process is performed in the internal-combustion machine. Subsequently, the exhaust gas produced in the internal-combustion machine is fed towards an energy consumer, in particular a turbine. At least part of the exhaust gas produced in the internal-combustion machine is returned to the aspirated fresh air. According to the invention, at least part of the exhaust gas from the internal-combustion machine is used as heating gas for heating the exhaust gas to be returned. The used heating gas may be entirely or partly fed to the energy consumer.

The method of returning exhaust gas according to the invention is further developed as described with reference to the exhaust gas return systems according to the invention.

Preferably, the heating gas is supplied to the exhaust gas immediately in front of and/or immediately behind the energy consumer. The amount of heating gas and/or the amount of returned exhaust gas is adjusted preferably in dependence on the temperature, in particular that of the fresh air supplied to the internal-combustion machine.

Preferably, when a predetermined temperature of the fresh air and/or the returned exhaust gas has been reached, the exhaust gas from the internal-combustion machine is, to its full amount, supplied to the energy consumer, i.e. the exhaust gas is not used as heating gas for heating the exhaust gas to be returned. It is thus automatically recognized whether, for example, the cold start phase of the internal-combustion machine necessitates utilization of the exhaust gas from the internal-combustion machine as heating gas. Since utilization of the exhaust gas as heating gas is no longer necessary when the predetermined temperature has been reached, the exhaust gas is fully utilized by the energy consumer.

BRIEF DESCRIPTION OF THE DRAWING

An embodiment of the invention will now be described in greater detail with reference to the appended drawing which shows a schematic representation of an exhaust gas return system according to the invention.

DETAILED DESCRIPTION OF A PREFERRED EMBODIMENT OF THE INVENTION

The exhaust gas return system according to the invention for an internal-combustion machine 10 comprises a low-pressure supply line 12 which feeds fresh air in the direction indicated by an arrow 16 from an inlet 14 to a compressor 18. From the compressor 18 a high-pressure supply line 20 extends to the internal-combustion machine 10. From the internal-combustion machine 10 a high-pressure exhaust gas line 22 extends to a turbine 24. From the turbine 24 a low-pressure exhaust gas line 26 extends in the direction indicated by an arrow 28 to an outlet 30. The low-pressure exhaust gas line 26 and the low-pressure supply line 12 have connected therewith a low-pressure return line 32.

The high-pressure exhaust gas line 22 has connected therewith a bypass line 34 which feeds at least part of the exhaust gas produced in the internal-combustion machine 10 in the direction indicated by an arrow 36. The volume flow fed in the direction indicated by an arrow 36 can be adjusted by means of a bypass valve 38. In the illustrated embodiment, the exhaust gas fed in the direction indicated by arrow 36 is supplied via the bypass line 34 to a heat exchanger 40 by means of which the returned exhaust gas in the low-pressure return line 32 can be heated.

The bypass line 34 further comprises a turbine bypass valve 42 by means of which the volume flow into the bypass line 34 can be split up. The turbine bypass valve 42 allows part of the heating gas of the bypass line 34 to be supplied in the direction indicated by an arrow 44 past the turbine 24 to the low-pressure exhaust gas line 26. Further, part of the heating gas can be supplied via the turbine bypass valve 42 in the direction indicated by an arrow 46 to the turbine 24.

The low-pressure exhaust gas line 26 further comprises a filter element 54 which is, for example, a diesel particulate filter. Further, the low-pressure exhaust gas line 26 includes an exhaust gas treatment device 56 which is in particular a catalyst.

The volume flow of the exhaust gas returned via the low-pressure return line 32 is adjustable by means of an exhaust gas return valve 58 arranged in the low-pressure exhaust gas line 26 and/or the low-pressure return line 32. The volume flow of the returned exhaust gas of the low-pressure return line 32 can be split up, by a heat exchanger valve 60, into a volume flow supplied in the direction indicated by an arrow 62 to the heat exchanger 40, and/or into a volume flow directed in the direction indicated by an arrow 64 via a bypass line 66 and past the heat exchanger 40. Preferably, in the bypass line 66 a cooler 68 is provided in case, in particular after the warm-up phase, the returned exhaust gas is not to be heated but cooled. The cooler may be provided for reliably preventing a critical temperature limit of the compressor 18 from being exceeded. Further, the high-pressure supply line 20 may also include a charge air cooler 70 serving for a comparable purpose.

The valves 38,42,58,60 mentioned above may be simple On/Off valves. Preferably, they are however 3/2-way valves and/or infinitely variable valves. This in particular allows the valves 38,42,58,60 to be controlled in dependence on the temperature of the gas in the high-pressure supply line 20. The temperature of the gas in the high-pressure supply line 20 can be measured using a temperature measuring sensor 72. Additionally and/or alternatively, the temperature of the returned gas of the low-pressure return line 32 can be measured with a second temperature measuring sensor 74. The temperature of the returned gas can further be indirectly measured by means of a λ-probe of the catalyst 56. Using the temperatures measured by the temperature measuring sensors 72,74 and/or the λ-probe of the catalyst 56, the valves 38,42,58,60 can be individually controlled and optimally adjusted to the respective operating condition of the internal-combustion machine 10.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. An exhaust gas return system for an internal-combustion machine comprising:
    a low-pressure supply line extending from an inlet to a compressor,
    a high-pressure supply line extending from the compressor to the internal-combustion machine,
    a high-pressure exhaust gas line extending from the internal-combustion machine to a turbine,
    a low-pressure exhaust gas line extending from the turbine to an outlet, and
    a low-pressure return line connected with the low-pressure exhaust gas line and the low-pressure supply line for returning exhaust gas,
    wherein a bypass line extending from said high-pressure exhaust gas line to said low-pressure exhaust gas line and/or back to the high-pressure exhaust gas line comprises a heat exchanger for heating at least part of the exhaust gas to be returned of the low-pressure return line.

2. The exhaust gas return system according to claim 1, wherein the bypass line and/or the high-pressure exhaust gas line comprise a bypass valve for adjusting the volume flow into the bypass line.

3. The exhaust gas return system according to claim 1, wherein the low-pressure exhaust gas line and/or the low-pressure return line comprise an exhaust gas return valve for adjusting the volume flow into the low-pressure return line.

4. The exhaust gas return system according to claim 1, wherein the low-pressure return line comprises a heat exchanger valve for adjusting the volume flow through the heat exchanger.

5. The exhaust gas return system according to claim 1, wherein the bypass line comprises a turbine bypass valve for adjusting the volume flow into the low-pressure exhaust gas line.

6. The exhaust gas return system according to claim 2, wherein at least one of the valves is in particular infinitely controlled in dependence on the temperature of the gas in the high-pressure supply line.

7. A method of returning exhaust gas for returning exhaust gas produced in an internal-combustion machine, in particular a diesel engine, to a fresh air flow for the internal-combustion machine, comprising the steps of:
    aspirating fresh air for the internal-combustion machine,
    performing a combustion process in the internal-combustion machine using fresh air,
    feeding the exhaust gas produced in the internal-combustion machine towards an energy consumer, in particular a turbine, and
    returning at least part of the exhaust gas to the aspirated fresh air,
    wherein at least part of the exhaust gas from the internal-combustion machine is used as heating gas for heating the exhaust gas to be returned.

8. The method of returning exhaust gas according to claim 7, wherein the heating gas is supplied to the exhaust gas immediately in front of and/or immediately behind the energy consumer.

9. The method of returning exhaust gas according to claim 7, wherein the amount of heating gas and/or returned exhaust gas is adjusted in dependence on the temperature, in particular that of the fresh air supplied to the internal-combustion machine.

10. The method of returning exhaust gas according to claim 7, wherein the exhaust gas from the internal-combustion machine is, to its full amount, supplied to the energy consumer as soon as a predetermined temperature of the fresh air and/or the returned exhaust gas has been reached.

* * * * *